(12) United States Patent
Anne

(10) Patent No.: US 8,756,152 B2
(45) Date of Patent: Jun. 17, 2014

(54) OPERATIONAL RISK BACK-TESTING PROCESS USING QUANTITATIVE METHODS

(75) Inventor: Ajay Kumar Anne, Peoria, IL (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 13/547,855

(22) Filed: Jul. 12, 2012

(65) Prior Publication Data
US 2014/0019195 A1 Jan. 16, 2014

(51) Int. Cl.
*G06Q 40/00* (2012.01)
(52) U.S. Cl.
USPC .......................................................... 705/38
(58) Field of Classification Search
CPC ........ G06Q 40/08; G06Q 40/00; G06Q 40/06
USPC .......................................................... 705/38
See application file for complete search history.

(56) References Cited

U.S. PATENT DOCUMENTS

| | | | |
|---|---|---|---|
| 6,223,143 B1 | 4/2001 | Weinstock et al. | |
| 6,301,563 B1 | 10/2001 | Brown et al. | |
| 6,360,210 B1 | 3/2002 | Wallman | |
| 6,430,584 B1 | 8/2002 | Comer et al. | |
| 6,453,303 B1 | 9/2002 | Li | |
| 6,560,541 B1 | 5/2003 | Singh | |
| 7,409,357 B2 | 8/2008 | Schaf et al. | |
| 7,778,856 B2* | 8/2010 | Reynolds et al. | 705/7.28 |
| 8,355,974 B2* | 1/2013 | DeLillio | 705/36 R |
| 8,447,688 B1* | 5/2013 | Thomas et al. | 705/38 |
| 2003/0149657 A1 | 8/2003 | Reynolds et al. | |
| 2004/0054563 A1 | 3/2004 | Douglas | |
| 2004/0068431 A1 | 4/2004 | Smith et al. | |
| 2004/0260703 A1* | 12/2004 | Elkins et al. | 707/100 |
| 2005/0027645 A1* | 2/2005 | Lui et al. | 705/38 |
| 2006/0195391 A1* | 8/2006 | Stanelle | 705/38 |
| 2009/0299896 A1 | 12/2009 | Zhang et al. | |
| 2010/0121784 A1 | 5/2010 | Lyons et al. | |
| 2012/0059750 A1* | 3/2012 | Mustafa et al. | 705/35 |
| 2012/0150570 A1* | 6/2012 | Samad-Khan et al. | 705/4 |

FOREIGN PATENT DOCUMENTS

| | | | | |
|---|---|---|---|---|
| CA | 2 368 931 | * 11/2001 | | G06F 17/60 |
| EP | 1276061 | 1/2003 | | |
| WO | WO 2012/073074 | * 12/2010 | | G06Q 40/00 |

OTHER PUBLICATIONS

PriceWaterhouseCoopers: A Practical Guide to Risk Assessment—How principles-based risk assessment enables organization to take the right risks, 2008, pp. 1-40.*
Bank for International Settlements: Developments in Modelling Risk Aggregation, Oct. 2010, Basel Committee on Banking Supervision, pp. 1-113.*

(Continued)

*Primary Examiner* — Bijendra K Shrestha
(74) *Attorney, Agent, or Firm* — Banner & Witcoff, Ltd.; Michael A. Springs

(57) ABSTRACT

Methods, computer-readable media, and apparatuses are disclosed for quantifying risk and control assessments. The risk includes both residual risk and direction of risk. Various aspects of the invention quantitatively compare the risk and control assessments against step-ahead losses using special regression models that are particularly applicable to this kind of data. The empirical comparison may be performed on both loss event frequency and severity in two different and separate dimensions. The empirical comparison may also be performed using losses extracted by even occurrence and event settlement dates in two separate dates.

21 Claims, 11 Drawing Sheets

(56) References Cited

OTHER PUBLICATIONS

Ip.com: Comprehensive Continuous Risk Assessment Process, Oct. 1, 2007, pp. 1-16.*

Institute of Management Accountants (IMA): Enterprise Risk Management: Tools and Techniques for Effective Implementation, 2007, pp. 1-34.*

Ching, S., et al., Backtesting Credit Portfolio on Internal Rating Based Approach—An Empirical Study on Taiwan Banking Industry, 26 pgs.

Sound practices for backtesting counterparty credit risk models, Basel Committee on Banking Supervision, Apr. 2010, 14 pgs.

Castermans, G., et al., An Overview and Framework for PD Backtesting and Benchmarking, 2007, 12 pgs.

* cited by examiner

400

| Residual Risk | Direction of Risk | Risk State | Risk Points | Aggregate risk points across 4 dimensions |
|---|---|---|---|---|
| Low | Decreasing | 1 | 0.5 | 2 |
| Low | Stable | 2 | 1 | 4 |
| Low | Increasing | 3 | 2 | 8 |
| Medium | Decreasing | 4 | 4 | 16 |
| Medium | Stable | 5 | 8 | 32 |
| Medium | Increasing | 6 | 16 | 64 |
| High | Decreasing | 7 | 29 | 116 |
| High | Stable | 8 | 50 | 200 |
| High | Increasing | 9 | 83 | 332 |

FIG. 4

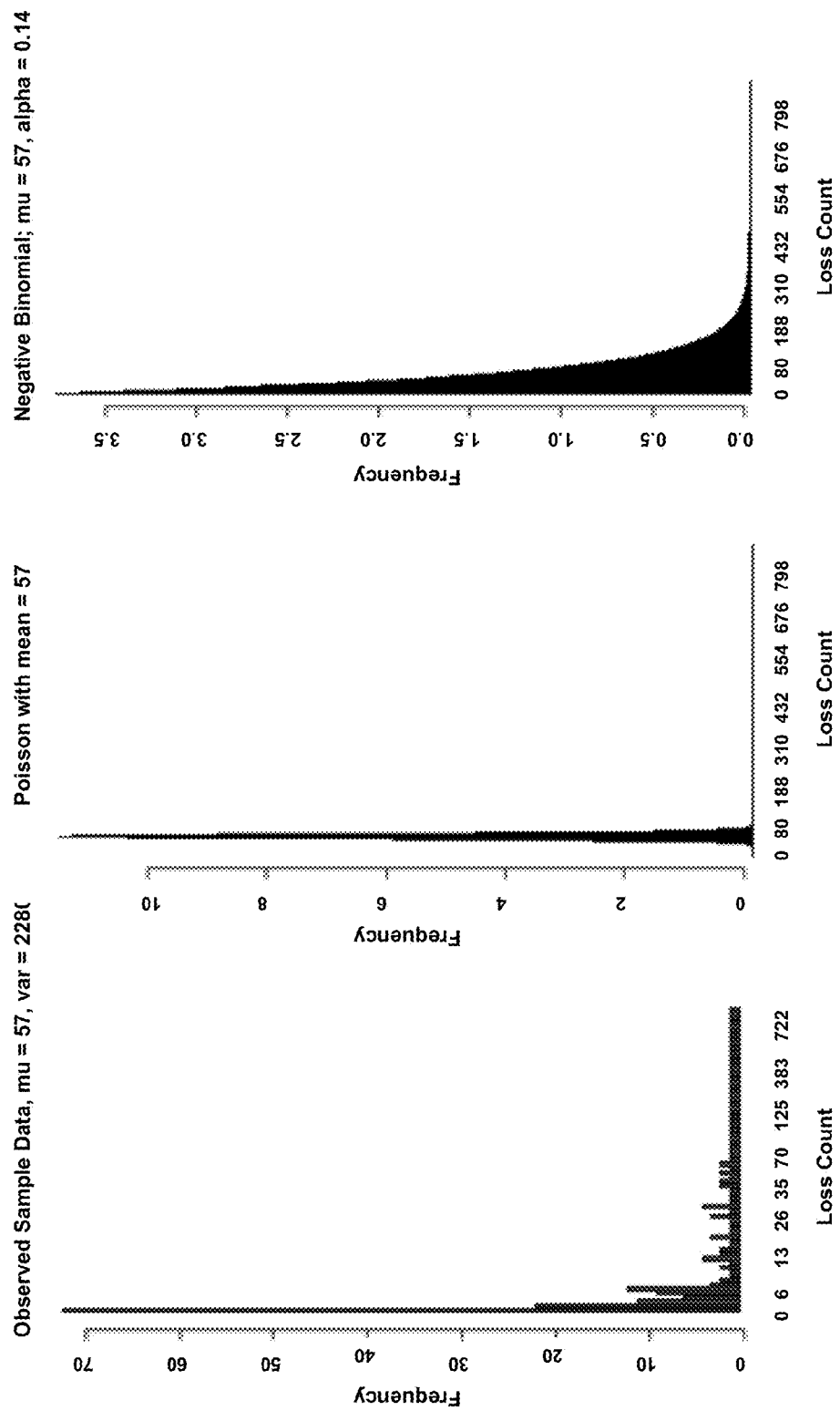

FIG. 9A

Level 1 RCSAs : Correlation Analysis by First Occurrence Date (Loss Severity vs. Residual Risks) 900

| RCSA Cycle 902 | Risk Type 904 | Linear Correlation (Pearson's) 906 | | | | Rank Correlation 908 | | | |
|---|---|---|---|---|---|---|---|---|---|
| | | Untransformed Data | | Log Transformed Data | | Spearman's Rho | | Kendall's Tau | |
| | | Coef | p-value | Coef | p-value | Coef | p-value | Coef | p-value |
| Q1 | Aggregate | 0.76 | 0.00 | 0.64 | 0.01 | 0.66 | 0.00 | 0.49 | 0.01 |
| Q2 | Aggregate | 0.82 | 0.00 | 0.75 | 0.00 | 0.72 | 0.00 | 0.54 | 0.00 |
| Q3 | Aggregate | 0.56 | 0.02 | 0.72 | 0.00 | 0.59 | 0.01 | 0.43 | 0.02 |

FIG. 9B

Level 1 RCSAs : Severity Regression Analysis by First Occurrence Date with Residual Risks 920

| RCSA Cycle 902 | Risk Type 904 | Log Transformed Data 922 | | |
|---|---|---|---|---|
| | | Adjusted R-sq | Coef. | p-value |
| Q1 | Aggregate | 37% | 5.03 | 0.01 |
| Q2 | Aggregate | 54% | 6.26 | 0.00 |
| Q3 | Aggregate | 49% | 5.04 | 0.00 |

OPERATIONAL RISK BACK-TESTING PROCESS USING QUANTITATIVE METHODS

FIELD

Aspects of the embodiments relate to methods, computer readable media, apparatuses, or computer systems that quantify risk and control assessments and quantitatively compare those risk and control assessments against losses using regression models.

BACKGROUND

Risk management is a process that allows any associate within or outside of a technology and operations domain to balance the operational and economic costs of protective measures while protecting the operations environment that supports the mission of an organization. Risk is the net negative impact of the exercise of vulnerability, considering both the probability and the impact of occurrence.

An organization typically has a mission. Risk management plays an important role in protecting against an organization's operational risk losses or failures. An effective risk management process is an important component of any operational program. The principal goal of an organization's risk management process should be to protect against operational losses and failures, and ultimately the organization and its ability to perform the mission.

Within the financial industry, the Basel II Capital Accord requires firms to capture key Business Environment and Internal Control Factors (BEICF) that can change its operational risk profile. These factors will make an organization's risk environments, help align capital assessments with risk management objectives, and recognize both improvements and deterioration in operational risk profiles in a more immediate fashion. To qualify for regulatory capital purposes the use of these factors in an organization's risk measurement framework must meet standards. Over time, the process and outcomes need to be validated through comparison to actual internal loss experience and appropriate adjustments made.

Under the United States final rule (issued in November 2007 by inter-agencies including FRB (Federal Reserve Board) and OCC (Office of the Comptroller of the Currency) to implement risk-based capital requirements in the United States for large, internationally active banking organizations), an organization has flexibility in the approach it uses to conduct its BEICFs. As such, the methods for conducting comparisons of these assessments against actual operational loss experience may also vary and precise modeling calibration may not be practical. It may still be important for an organization to perform such comparisons to ensure that its assessments are current, reasonable, and appropriately factored into the organization's AMA framework. In addition, the comparisons could highlight the need for potential adjustments to the organization's operational risk management processes.

Back-testing is the comparison of forecasts to realized outcomes. Any risk assessment system is considered well calibrated if the (ex-ante) estimated risk assessment measures deviate only marginally from what has been observed ex-post. The challenge is how to quantify the deviation and how to perform the comparison given all the subtle wrinkles presented by operational risks.

Currently, based on industry benchmarking and from regulators, most organizations and banks may perform either a qualitative review or a simple trend analysis (comparing trends of risks against trends of losses to derive subjective opinions and qualitative outputs). No organization currently back-tests subjective operational risk and control assessments against objective losses quantitatively and use the model output to (a) adjust risk-based capital, (b) forecast step-ahead losses from risk and control assessments and (c) validate the accuracy of the assessments.

BRIEF SUMMARY

Aspects of the embodiments address one or more of the issues mentioned above by disclosing methods, computer readable media, and apparatuses for performing operational risk BEICF back-testing process using quantitative methods for quantifying risk and control assessments and quantitatively comparing against losses using regression models.

According to an aspect of the invention, a computer-assisted method that provides quantification of risk and control assessments and quantitatively compares against losses using regression models. The method may include the steps of: 1) identifying a set of risk assessments, a set of control assessments, and a set of financial losses; 2) translating, by a risk management computer system, the set of risk assessments and the set of control assessments to a set of risk states and a set of risk points; and 3) conducting, by a risk management computer system, data analysis and statistical analysis on the set of financial losses, the set of risk states, and the set of risk points, wherein the data analysis and the statistical analysis includes a qualitative comparison and analysis and a quantitative comparison. Additionally, the method may further comprise the step of back-testing the set of risk assessments with the set of financial losses. The translation of the set of risk states into the set of risk points may be done using an exponential scale. Additionally, the set of risk assessments may include both a residual risk and a direction of risk. The data analysis and the statistical analysis may be performed on the set of financial losses for both a financial loss frequency and a financial loss severity. Also, the data analysis and the statistical analysis may be performed on the set of financial losses aggregated by multiple loss dates. The two different dates may include a loss occurrence date and a loss settlement date, and can be extended to other dates such as loss detection date.

According to aspects of the invention, the quantitative comparison includes the steps of: performing statistical analysis such as correlation and regression analysis using regression models, estimating a set of regression coefficients and a set of correlation coefficients, and assessing the regression model adequacy. The regression model may include linear regression using a transformed scale. The regression model may also include quantile regression. The regression model may also include count (frequency) regression.

According to another aspect of the invention, the quantitative comparison includes the steps of: performing correlation analysis using both linear and rank correlation, estimating a set of correlation coefficients, and determining the statistical significance of the set of correlation coefficients. According to another aspect of the invention, risk-based capital may be adjusted using one or more outputs from the quantitative comparison of risk and control assessments with step-ahead operational losses.

According to another aspect of this invention, an apparatus may comprise: at least one memory; and at least one processor coupled to the at least one memory and configured to perform, based on instructions stored in the at least one memory: 1) identifying a set of risk assessments, a set of control assessments, and a set of financial losses; 2) translating the set of risk assessments and the set of control assessments to a set of risk states and a set of risk points; and 3) conducting data analysis and statistical analysis on the set of financial losses, the set of risk states, and the set of risk points. The data analysis and the statistical analysis may include a qualitative comparison and analysis and a quantitative comparison. The data analysis and the statistical analysis may be performed on the set of financial losses for both a financial loss frequency and a financial loss severity. Further, the quantitative comparison may include one or more of the following: regression analysis using a regression model; and correlation analysis using both linear and rank correlation.

According to aspects of the invention, the set of risk assessments may include both a residual risk and a direction of risk. Additionally, the regression model may include one or more of the following: linear regression using a transformed scale, quantile regression, and count regression. Also, the regression analysis may include estimating a set of regression coefficients and a set of correlation coefficients and assessing the regression model adequacy. Furthermore, the correlation analysis may include estimating a set of correlation coefficients and determining the statistical significance of the set of correlation coefficients.

According to another aspect of the invention, a computer-readable storage medium storing computer-executable instructions that, when executed, cause a processor to perform a method may comprise: 1) identifying a set of risk assessments that includes residual risk and direction of risk, a set of control assessments, and a set of financial losses, wherein the set of financial losses include financial loss frequency and financial loss severity; 2) back-testing the set of risk assessments with the set of financial losses; 3) translating the set of risk assessments and the set of control assessments to a set of risk states and a set of risk points using an exponential scale; and 4) conducting data analysis and statistical analysis on the set of financial losses, the set of risk states, and the set of risk points. The data analysis and the statistical analysis may include a qualitative comparison and analysis and a quantitative comparison. The quantitative comparison may include one or more of the following: regression analysis using a regression model; and correlation analysis using both linear and rank correlation.

These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which:

FIGS. 4 through 9B show various illustrative tables for use with example embodiments in accordance with aspects of the invention.

DETAILED DESCRIPTION

In accordance with various aspects of the invention, methods, computer-readable media, and apparatuses are disclosed for quantifying risk and control assessments. The risk includes both residual risk and direction of risk. Various aspects of the invention quantitatively compare the risk and control assessments against step-ahead losses using special regression models that are particularly applicable to this kind of data. The empirical comparison may be performed on both loss event frequency and severity in two different and separate dimensions. The empirical comparison may also be performed using losses extracted by event occurrence and event settlement dates in two separate dates.

The empirical comparison may help in (1) meeting regulatory requirements (such as compliance to Basel II AMA); (2) validating the risk and control assessments (RCSA) against actual performance; (3) helping in adjusting capital based on dynamic and empirical data; and (4) forecasting losses at a confidence level determined by the statistical association or relationships of RCSA with losses. Minimally, back-testing may be a "validation" function, but it may also be an "analytical" function. The back-testing may also, for example, help with forecasting future operational losses.

Currently, there is a need for an organization or bank to have a formal process to compare Business Environment and Internal Control Factors (BEICF) assessments against operational losses. Organizations have not established a sound quantitative process to use these results from this analysis to support the methodology for making qualitative adjustments to modeled capital estimates or calibrate the adjustment range. RCSA's qualitative adjustment methodology provides a BEICF qualitative adjustment to operational risk capital between a chosen range (such as −10% and +25%). Generally, organizations do not calibrate the adjustment range regularly enough. There should be a process established to compare BEICF results to actual losses. There should also be a process established for using the results of the analysis as an input into deriving an appropriate qualitative adjustment range and applying such adjustments to modeled operational risk capital estimates. An adjustment range should be supported by empirical analysis to allow reductions to capital. Aspects of the current invention answer the question, "How good are these risk and control self assessments?" and "Are they good enough that we can adjust the capital or risk decisions based on the risk and control self assessments?"

According to an aspect of the invention, performing operational risk BEICF back-testing process using quantitative methods may include one or more of the following steps: 1) defining the granularity and unit-of-measure for the risks; 2) performing exploratory data analysis and statistical analysis; and 3) summarizing the results.

Figure 1:
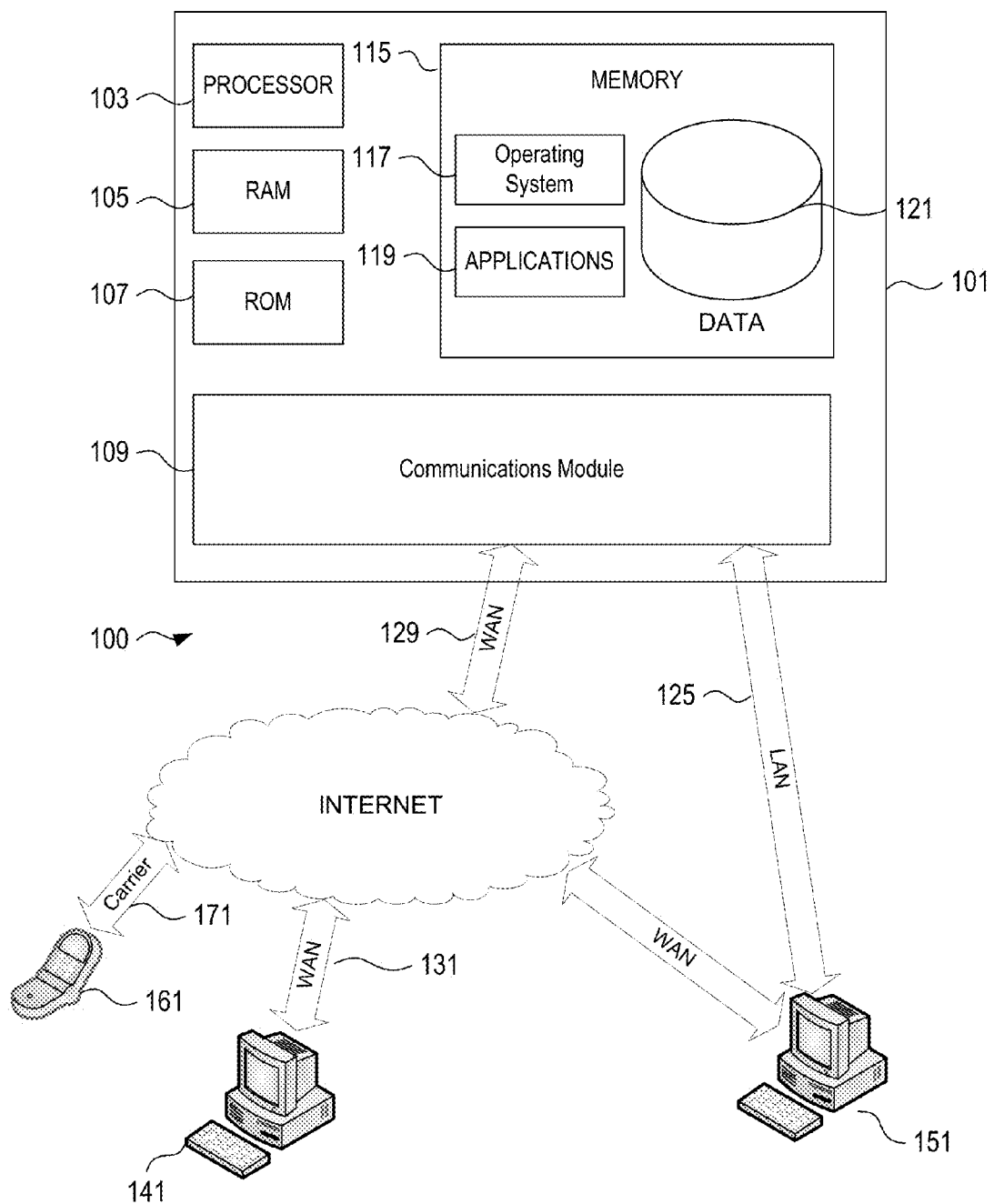
FIG. 1 shows an illustrative operating environment in which various aspects of the invention may be implemented.

FIG. 1 illustrates an example of a suitable computing system environment 100 that may be used according to one or more illustrative embodiments. The computing system environment 100 is only one example of a suitable computing environment and is not intended to suggest any limitation as to the scope of use or functionality of the invention. The computing system environment 100 should not be interpreted as having any dependency or requirement relating to any one or combination of components shown in the illustrative computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Computing system environment 100 may also include optical scanners (not shown). Exemplary usages include scanning and converting paper documents, e.g., correspondence, receipts, to digital files.

Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). Database 121 may provide centralized storage of risk information including attributes about identified risks, characteristics about different risk frameworks, and controls for reducing risk levels that may be received from different points in system 100, e.g., computers 141 and 151 or from communication devices, e.g., communication device 161.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. Branch computing device 161 may be a mobile device communicating over wireless carrier channel 171.

The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages. The network connections may also provide connectivity to a CCTV or image/iris capturing device.

Additionally, one or more application programs 119 used by the computing device 101, according to an illustrative embodiment, may include computer executable instructions for invoking user functionality related to communication including, for example, email, short message service (SMS), and voice input and speech recognition applications.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the invention is contemplated. For example, aspects of the method steps disclosed herein may be executed on a processor on a computing device 101. Such a processor may execute computer-executable instructions stored on a computer-readable medium.

Figure 2:
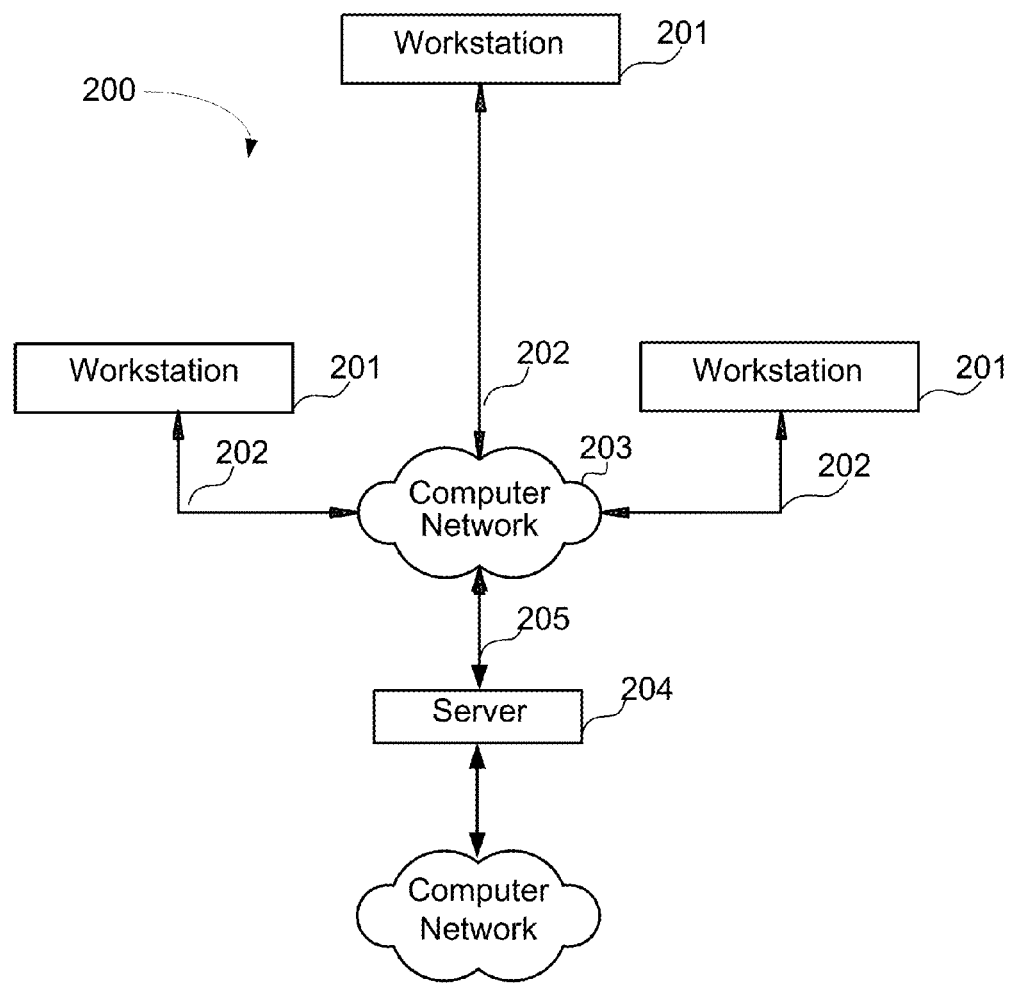
FIG. 2 is an illustrative block diagram of workstations and servers that may be used to implement the processes and functions of certain aspects of the present invention.

Referring to FIG. 2, an illustrative system 200 for implementing methods according to the present invention is shown. The system 200 may be a risk management system in accordance with aspects of this invention. As illustrated, system 200 may include one or more workstations 201. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, and hard-wired links. Connectivity may also be supported to a CCTV or image/iris capturing device.

The steps that follow in the figures may be implemented by one or more of the components in FIGS. 1 and 2 and/or other components, including other computing devices.

Figure 3A:
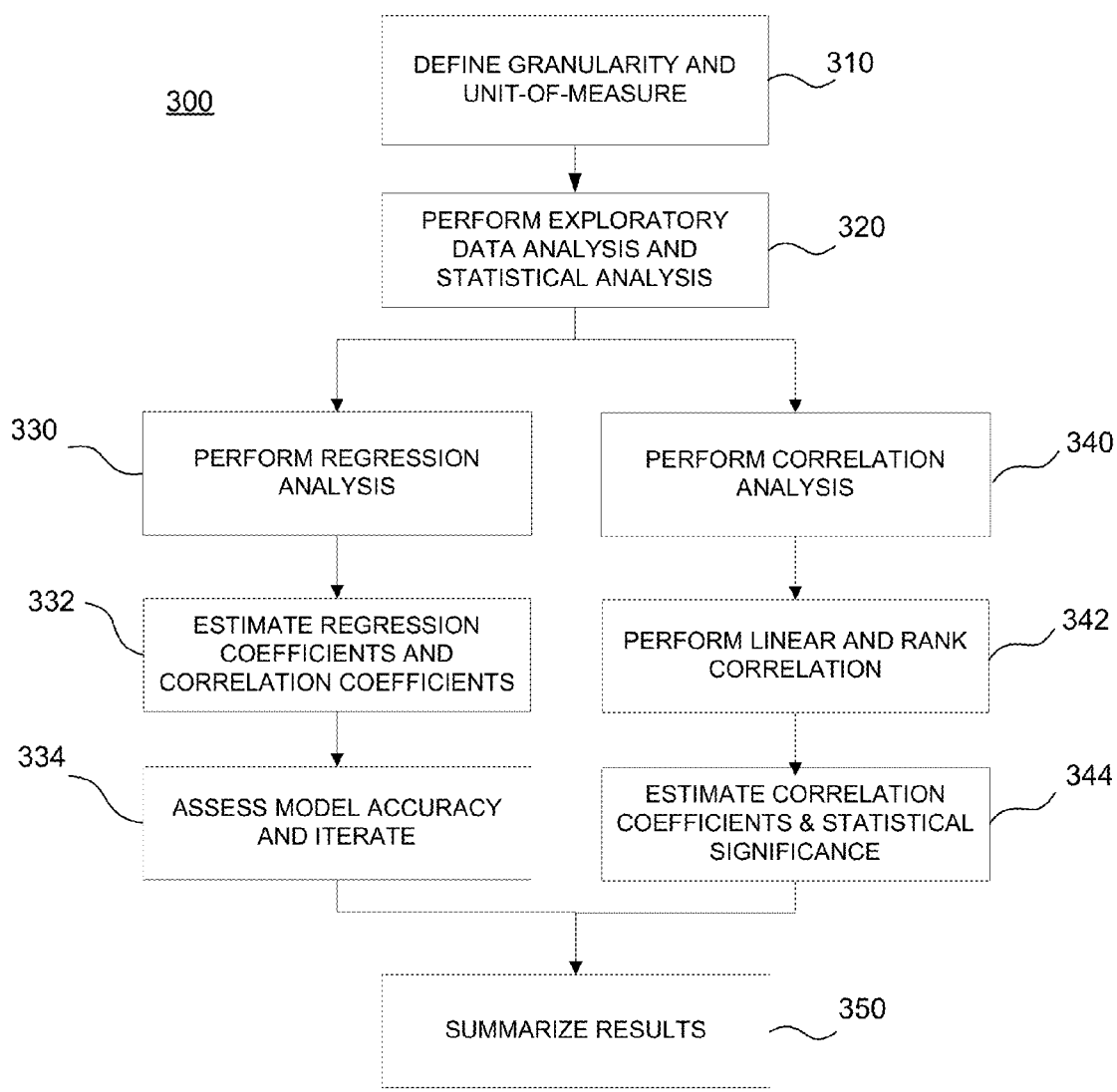
FIGS. 3A and 3B show a flow chart for quantifying risk and control assessments and comparing losses in accordance with an aspect of the invention.
Figure 3B:
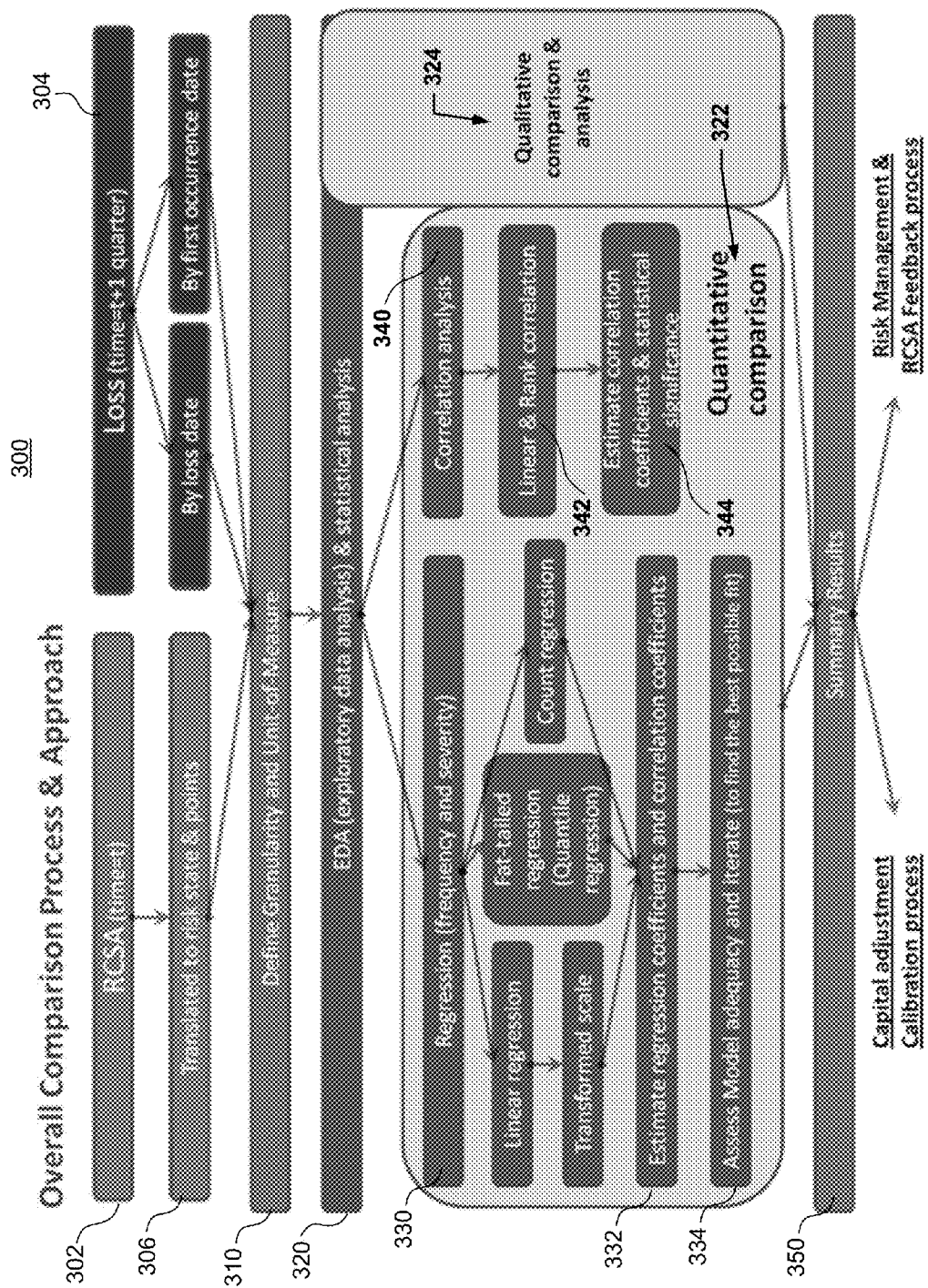

FIGS. 3A and 3B show a flow chart 300 for testing operational risk business environment and internal control factors (BEICF) using quantitative methods in accordance with an aspect of the invention. There may be many different outputs associated with aspects and embodiments of this invention, which may include, but are not limited to: regression models that help in loss forecasting as a by-product of the comparison process; linking capital adjustments based on empirical calibrations; empirically identified lines of business (LOBs) or business units and/or enterprise control functions (ECFs) or corporate functions that are correct, such as assessment and realization (of step-ahead loss) that are aligned; and business units and/or corporate functions that are not correct, such as over-assessed risk or under-assessed risk.

As illustrated in FIG. 3A, the method may include one or more of the following steps: 1) defining the granularity and unit-of-measure for the risks 310; 2) performing exploratory data analysis and statistical analysis 320; and 3) summarizing the results that may be used in risk measurement (including capital adjustment) or in risk management 350.

Additionally, the method may include both a method for risk control and assessments 302 and for losses 304. The risk control and assessments 302 may include translating to risk state and points 306. As illustrated in FIG. 4, the translation of risk control and assessments to risk state and risk points may help in (1) translating categorical and ordinal variables to discrete values and (2) collapsing two dimensions, both risk state and direction of risk, into one dimension. FIG. 4 illustrates a table 400 for the translation of risk control and assessments to risk state and risk points that may list residual risk, direction of risk, risk state, risk points, and aggregate risk points across four dimensions. People, process, systems and external events may be the four dimensions. Other dimensions may be utilized without departing from this invention.

Figure 5:
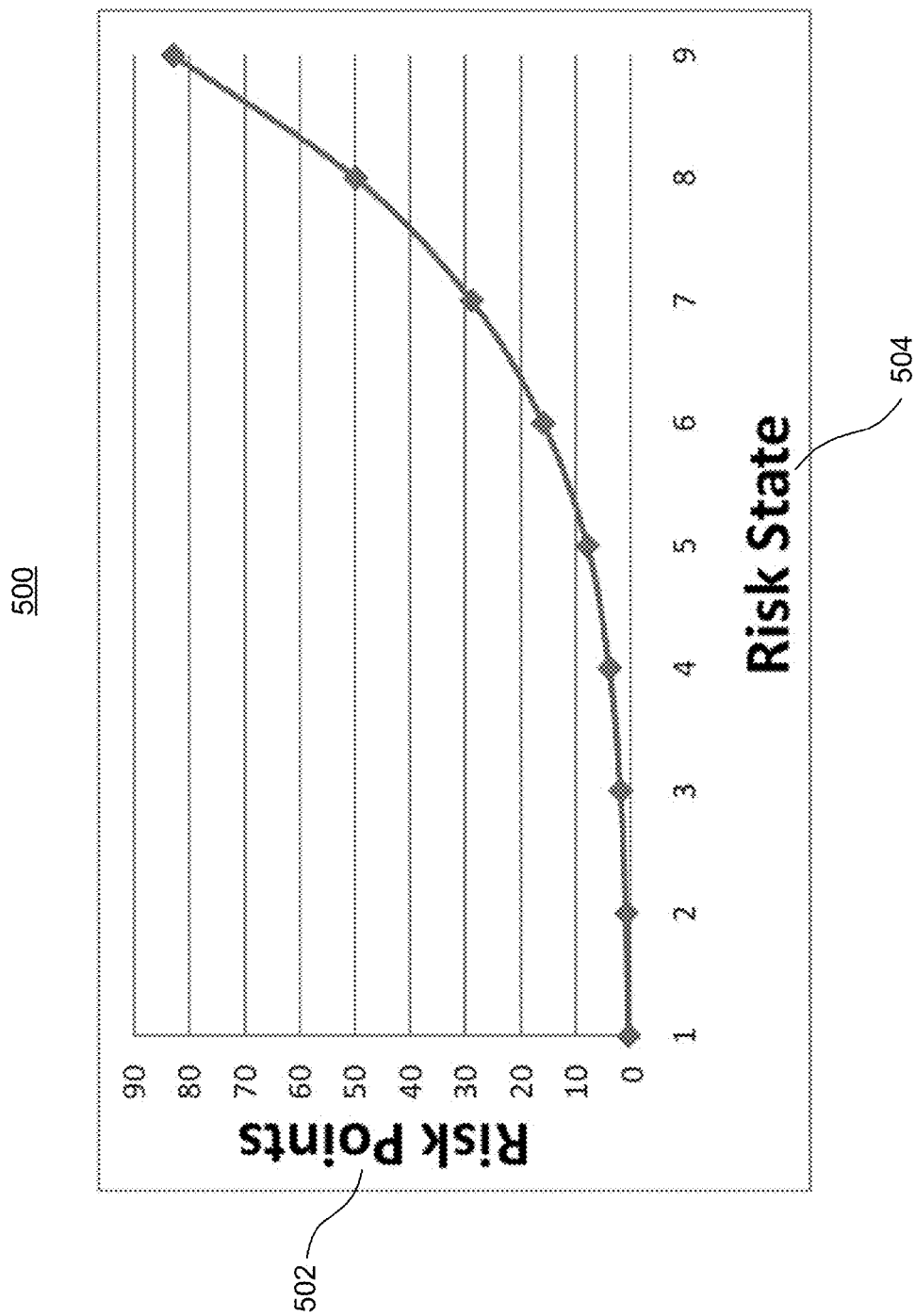

Table 400 indicates a given risk state for each of the four listed dimensions that are translated into risk points and then the combined aggregate risk points across the four dimensions are obtained by a simple arithmetic summing of the risk points for the 4 individual dimensions. A different implementation can weigh the dimensions differently to obtain a different aggregate risk points. However, in the example shown in table 400, all four dimensions are equi-weighted for simplicity. The residual risk column 402 may include ratings of low, medium, and high (3 levels). The direction of risk column 404 may include directions such as decreasing, stable, and increasing (3 levels). Other granular levels (more or less) may be defined without departing from this disclosure. The risk state column 406 may be numbered from 1 through 9. The risk points 408 may be values based on the risk in increasing values. For example, the risk points 408 may increase from 0.5 to 83 over the 9 different risk states. Other values and rankings for the risk state 406 and the risk points 408 may be utilized without departing from this disclosure. The aggregate risk points across 4 dimensions 410 may generally be calculated by multiplying the risk points 408 value by 4. FIG. 5 illustrates a table 500 defined by the translation of risk state into risk points using an exponential scale. FIG. 5 specifically exponentially graphs the risk points 502 from FIG. 4 along the y-axis for each of the risk states 504 along the x-axis. Even in exponential increase of risk points other (either steepened or flattened) curves may be selected apart from the particular choice demonstrated here without departing from this disclosure. Other (non-exponential and say polynomial) translation of risk state into risk points may be utilized without departing from this disclosure.

As described above, the method may include losses 304. The losses 304 may be categorized both by loss date and by first loss occurrence date. Other dates (e.g., loss detection date) may be used without departing from this disclosure. Additionally, in block 310, the method/process may include defining the granularity and unit-of-measure for the risks. The unit-of-measure may include enterprise (that may include people, process, systems, and external events) and business units vs. corporate functions. Hence it is up to the implementation to back-test either the aggregated enterprise losses or any or all of the individual people, process, systems, and external losses. Similarly, enterprise losses are comprised of losses suffered by individual business units and enterprise control functions and it is up to the implementation to back-test either the aggregated enterprise losses or any or all of the individual business units or corporate functions. Aspects of the invention may define granular units of measure perform the comparisons at granular levels. For example, the granular levels may include comparisons of risks against step-ahead losses for "people risks," "business unit vs. corporate functions," "domestic vs. regions," "business unit-1 vs. business unit-2," and further on.

As illustrated in FIGS. 3A and 3B, the exploratory data analysis and statistical analysis step 320 may follow the defining the granularity and unit-of-measure step at block 310. There are many different methods of exploratory data analysis and statistical analysis 320 that may be utilized without departing from this invention. Generally, the data analysis and statistical analysis 320 may include both qualitative comparison and analysis 322 and quantitative analysis 324.

As illustrated in FIG. 3B, the quantitative analysis 322 may include regression analysis/modeling 330 and correlation analysis 340. The regression analysis/modeling 330 may be conducted using both frequency and severity. The regression analysis 330 may include linear regression, fat-tailed regression or quantile regression, and count (frequency) regression. The linear regression may also include a transformed scale of either response and/or explanatory variables. Other regression models may be utilized without departing from this invention. The fat-tailed regression models may include quantile regression or linear regression on log-transformed data for severity based comparison. Other models that handle zero preponderance well may include zero-inflated negative binomial and hurdle models used for frequency based comparison of risk and control self-assessments with step-ahead losses.

Figure 6A:
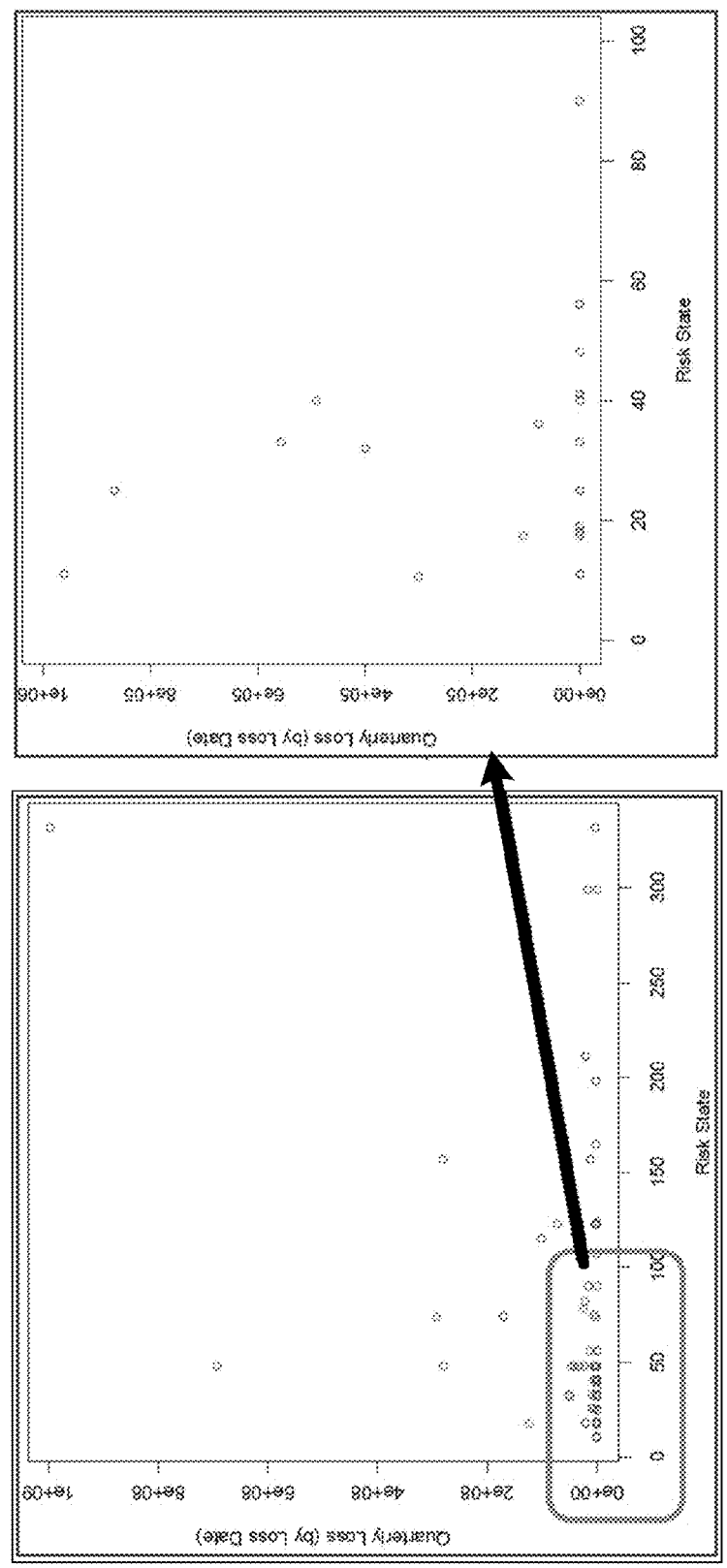

FIGS. 6A-6D represents typical distributional characteristics exhibited by operational loss event count data (frequencies) and regression models that are specifically applicable in such cases. Specifically, as illustrated in FIGS. 6A and 6B, the loss event arrival rates (frequency or counts) exhibit left censored (at zero), zero preponderance and is anything but a normal distribution. Hence standard linear regression models (that assume constant variance, normal errors) are inappropriate for modeling count data. Furthermore, as illustrated in FIG. 6C, the standard Poisson count regression (1-parameter) models may not be applied for data exhibiting fat-tailed, skewed characteristics and zero preponderance. However, as illustrated in FIG. 6D, the negative binomial and particularly zero-inflated or hurdle models may be found especially applicable for the loss event count regression models and analysis.

Following the regression 330 as performed in any of the above methods, the next step may be estimating regression coefficients and correlation coefficients 332. Following the estimating regression coefficients and correlation coefficients at block 332, the next step may include assessing model adequacy and iterating 334 to find the best possible fit of appropriate model to the data.

Additionally, following the correlation 340, the next step may be performing linear and rank correlation 342. Following the linear and rank correlation block 342, the next step may include estimating correlation coefficients and determining statistical significance 344.

Additionally, as illustrated in FIGS. 3A and 3B, following the data analysis and statistical analysis 320 step, the next step may be summarizing the results 350. The summarizing results 350 may include a capital adjustment calibration process. Also, the summarizing results 350 may include a risk management and RCSA feedback process.

Figure 8:
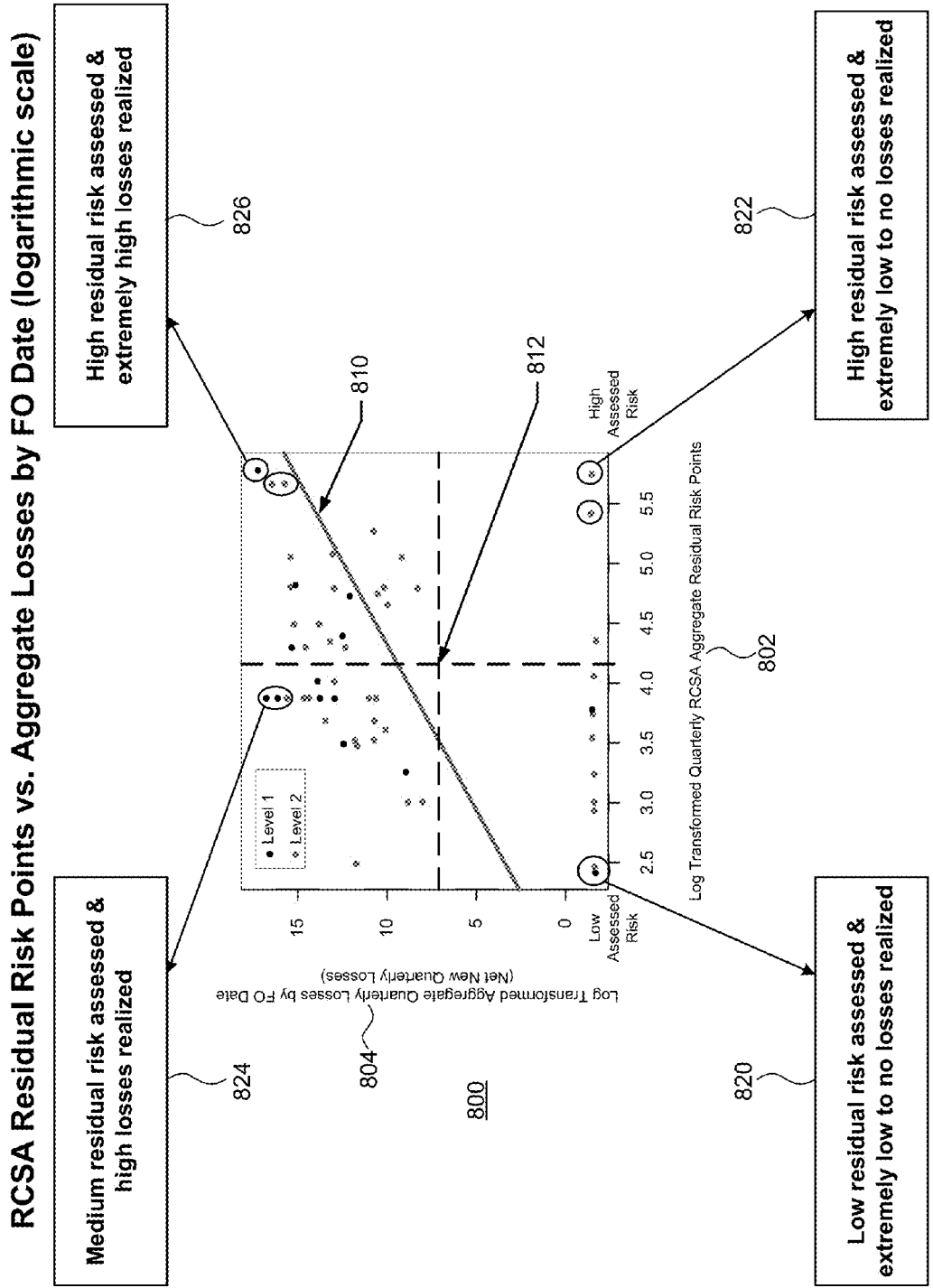

For the summarizing results 350 step, and outputting the results, in another aspect of this invention, the methods, computer-readable media, and apparatuses may include using the output in the RCSA feedback process and operational risk framework for strengthening the analysis. FIG. 8 illustrates a scatter plot 800 of a quarterly RCSA residual risk points versus a second following quarters aggregate losses by FO data. The scatter plot 800 may be graphed in a logarithmic scale. The x-axis on the scatter plot 800 may be the log transformed past quarter RCSA aggregate residual risk points 802. The x-axis on the scatter plot 800 may span from a 2.5 or low assess risk to a 5.5 or high assessed risk. The choice of the axis span is dependent on the risk-state to risk-point translation shown in FIG. 4. The y-axis on the scatter plot 800 may be the log transformed aggregate former quarter losses by FO date or the net new quarterly losses 804.

As illustrated in FIG. 8, the scatter plot 800 may be divided diagonally 810 to separate the data. Additionally, in another embodiment, without departing from the invention, the scatter plot 800 may be divided into a 2×2 grid or a 3×3 grid 812. In one example, the scatter plot 800 may be indicated with shades of gray, such as low assessed residual risk but high losses realized cell in the upper left corner and high assessed residual risk but low losses realized in the lower right corner. The grids may be created or made using vertical and horizontal lines and/or diagonal lines.

FIG. 8 illustrates four differing sets of data as defined on the scatter plot 800. The lower left 820 of the scatter plot 800 may define low residual risk assessed and extremely low or no losses realized. The lower right 822 of the scatter plot 800 may define high residual risk assessed and extremely low or no losses realized. The upper left 824 of the scatter plot 800 may define medium/high residual risk assessed and high losses realized. The upper right 826 of the scatter plot 800 may define high residual risk assessed and extremely high losses realized.

For the summarizing results 350 step, and outputting the results, in another aspect of this invention, the methods, computer-readable media, and apparatuses may include using the output in the capital adjustment and calibration process for regression analysis. This may be further defined by the calibration of qualitative adjustment based not on BCEIF factors, but based on the performance of the BEICFs. The following equation may be utilized to define this capital adjustment process with β being the regression slope coefficient (obtained from the regression modeling).

$$QA_i = \beta(n_i-1)/(n-1)(QA_{max}-QA_{min})+QA_{min}$$

With:
  $QA_i$ defined as qualitative adjustment factor for $i^{th}$ unit;
  $\beta$ defined as the regression slope coefficient;
  $n_i$ defined as rank-order of the risk point total for the $i^{th}$ unit outcome between risk neutral state and highest risk state. Note: risk-neutral state may be defined as Medium-stable 402 (with medium in residual risk and stable in direction of risk). Other selections can be made to the risk-neutral state without departing from this disclosure;
  n defined as the number of possible risk states (based on risk points) between risk neutral state and highest risk state;
  $QA_{max}$ defined as the maximum (ceiling) of the qualitative adjustment, example 25% or 40%; and
  $QA_{min}$ defined as the minimum (floor) of the qualitative adjustment, example 0% or −10% or −25%.

In another aspect of this invention, the methods, computer-readable media, and apparatuses may include the output being used in loss forecasting. For example, the out may be calculated using Log (Aggregate FO loss amount)=Regression_intercept+Regression_slope_coefficient*(log aggregate risk points)+ϵ(a constant).

In another aspect of this invention, the methods, computer-readable media, and apparatuses may include comparing of risk/control assessment against step-ahead losses. Additionally, in another aspect of this invention, the methods, computer-readable media, and apparatuses may include comparing of risk/control assessment against loss frequency and loss severity. The loss frequency may be defined by event count.

Figure 7:
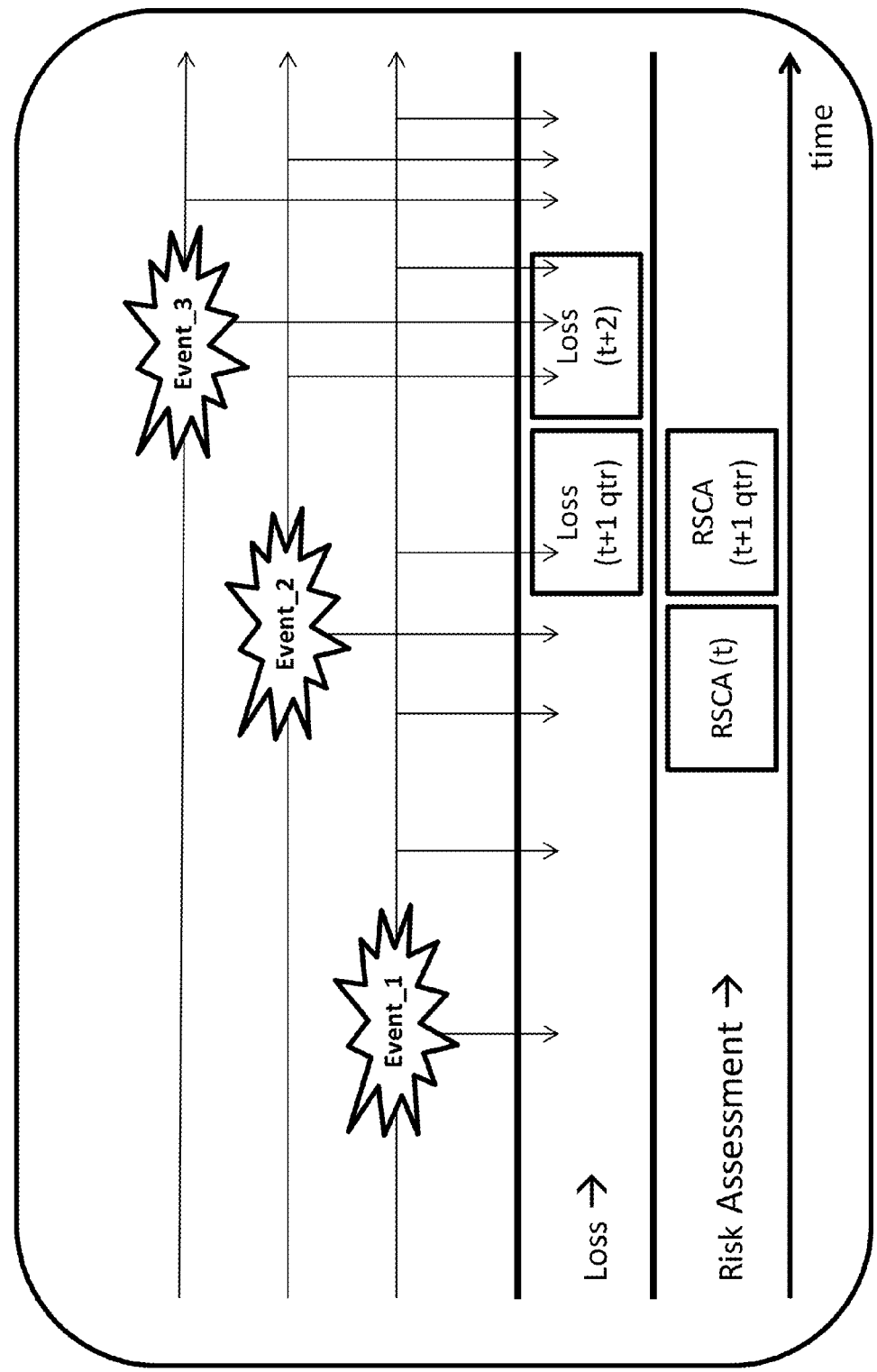

In another aspect of this invention, the methods, computer-readable media, and apparatuses may include comparing of risk/control assessment against losses by two different dates. The first date may be the first loss occurrence date and the second date may be the loss settlement date. The first loss occurrence date may help in comparing with new net losses. FIG. 7 illustrates a table 700 that shows the comparison of risk/control assessment against losses by two different dates. The choice of dates used to aggregate losses can be either based on operational loss event occurrence, detection, settlement, dates. Operational losses such as litigation tend to exhibit multiple impacts (for the same event) that span over long periods of time. Hence losses aggregated by different dates tend to exhibit non-trivial variations and this fact may be factored in the selection. The choice of the dates hence may impact the analysis and modeling.

In another aspect of this invention, the methods, computer-readable media, and apparatus may include regression models used for the comparison, comparing beyond statistical correlations. Additionally, operational loss may be used as a responder and risk assessment as a predictor or explanatory variable in the regression models.

In another aspect of this invention, the methods, computer-readable media, and apparatuses may include the ability to normalize the dataset for additional risk management insights. For instance, the comparison may be performed on loss for a given amount of money or revenue (for lines of business) and for a give money or expense (for corporate functions). Additionally, it may provide the ability to keep track over time the strength of association of risk assessments with realized (step-ahead) losses.

In another aspect of this invention, the methods, computer-readable media, and apparatuses may include reporting of results. FIG. 9A illustrates a table 900 of Level 1 RCSAs and a correlation analysis by first occurrence data (loss severity vs. residual risk). FIG. 9B illustrates a table 920 of Level 1 RCSAs and a severity regression analysis by first occurrence date with residual risks. Both FIGS. 9A and 9B list consecutive RCSA cycles 902 in quarters, such as Q1, Q2, and Q3. Both FIGS. 9A and 9B also list the risk type 904 for each quarter, such as Aggregate. FIG. 9A may include a linear correlation for example, Pearson's linear correlation 906 that may include untransformed data and log transformed data for both the coefficient and p-value. Additionally, FIG. 9A may include rank correlations 908 using both Spearman's Rho and Kendall's Tau for the coefficient and p-value. FIG. 9B may include log transformed data 922 for an adjusted R-squared, the coefficient, and the p-value. In FIG. 9B, item 906 may report the magnitude of the linear correlation of risk and control self-assessment with a step-ahead losses and they tend to be closer to 1.0 and away from 0.0 if the self-assessments turn out to be rather accurate. Similarly, item 908 in FIG. 9A reports magnitude of rank correlation. Additionally, item 922 in FIG. 9B reports sample regression modeling results including regression slope (indicated by Adjusted R-square), regression coefficient and p-value. Similar reporting can be used for frequency (count) data regression modeling. Other reporting structures and styles may be used without departing from this disclosure.

Additional embodiments of this invention may include a broader and bigger market beyond the domestic United States. Basel II compliance may be phased with Europe and other North American early pioneers, compared to other regions/countries. The aspects and embodiments of this invention may be utilized within the United States and outside of the United States. Even though regional central banks and organizations may extend the Basel II framework for regulatory compliance and guidelines, by and large, many other countries follow the guidelines set for in the United States. Many firms and organizations (even non-banking and non-financial sector) require operational risk BEICF back-testing. The concept of operational risk BEICF back-testing may be industry agnostic, so many other industries and organizations may utilize the operational risk BEICF back-testing process as described without departing from this invention.

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. They may determine that the requirements should be applied to third party service providers (e.g., those that maintain records on behalf of the company).

I claim:

1. A computer-assisted method comprising:
identifying, by a computer device, a set of risk assessments, a set of control assessments, and a set of realized financial losses;
translating, by the computer device, the set of risk assessments and the set of control assessments to a set of risk states and a set of risk points across four dimensions, the dimensions including people, process, systems, and external events, wherein the set of risk assessments list a residual risk and a direction of risk for each of the four dimensions and the set of risk states and the set of risk points list a risk state and a risk point for each of the four dimensions;
determining, by the computer device, a set of aggregate risks comprising an aggregate of the set of risk points across the four dimensions, wherein each aggregate risk of the set of aggregate risks corresponds to a particular risk state and is determined by combining risk points associated with the particular risk state of the four dimensions;
conducting, by the computer device, data analysis and statistical analysis on the set of realized financial losses, the set of risk states, the aggregate risk, and the set of risk points, wherein the data analysis and the statistical analysis includes a qualitative comparison and analysis and a quantitative comparison, wherein the quantitative comparison includes a regression analysis and a correlation analysis; and
conducting, by the computer device, a risk-based capital adjustment using empirical results of the qualitative comparison and analysis with the set of realized financial losses.

2. The method of claim 1, further comprising:
back-testing, by the computer device, the set of risk assessments with the set of realized financial losses.

3. The method of claim 1, wherein the translation of the set of risk states and the set of risk points is done using an exponential scale.

4. The method of claim 1, wherein the set of risk assessments include both a residual risk and a direction of risk.

5. The method of claim 1, wherein the data analysis and the statistical analysis is performed on the set of financial losses for both a financial loss frequency and a financial loss severity.

6. The method of claim 1, wherein the data analysis and the statistical analysis is performed on the set of financial losses aggregated by multiple loss dates.

7. The method of claim 6, wherein the two different dates include a loss occurrence date and a loss settlement date.

8. The method of claim 1, wherein the quantitative comparison includes the steps of:
performing, by the computer device, statistical analysis such as correlation and regression analysis using regression models,
estimating, by the computer device, a set of regression coefficients and a set of correlation coefficients, and
assessing, by the computer device, the regression model adequacy.

9. The method of claim 8, wherein the regression models includes linear regression using a transformed scale.

10. The method of claim 8, wherein the regression models includes quantile regression.

11. The method of claim 8, wherein the regression models includes count regression.

12. The method of claim 1, wherein the quantitative comparison includes the steps of:
performing, by the computer device, correlation analysis using both linear and rank correlation,
estimating, by the computer device, a set of correlation coefficients, and
determining, by the computer device, the statistical significance of the set of correlation coefficients.

13. The method of claim 1, comprising using a set of results as defined from a qualitative comparison and analysis and a quantitative comparison to adjust capital of an organization.

14. An apparatus comprising:
at least one memory; and
at least one processor coupled to the at least one memory and configured to perform, based on instructions stored in the at least one memory:
identifying a set of risk assessments, a set of control assessments, and a set of realized financial losses;
translating the set of risk assessments and the set of control assessments to a set of risk states and a set of risk points across four dimensions, the dimensions including people, process, systems, and external events, wherein the set of risk states and the set of risk points list a residual risk, a direction of risk, a risk state, and a risk point for each of the four dimensions;
determining a set of aggregate risks comprising an aggregate of the set of risk points across the four dimensions, wherein each aggregate risk of the set of aggregate risks corresponds to a particular risk state and is determined as a combination of risk points associated with the particular risk state of the four dimensions; and
conducting data analysis and statistical analysis on the set of realized financial losses, the set of risk states, and the set of risk points, wherein the data analysis and the statistical analysis includes a qualitative comparison and analysis and a quantitative comparison, wherein the data analysis and the statistical analysis is performed on the set of realized financial losses aggregated by multiple loss dates for both a financial loss frequency and a financial loss severity, and further wherein the quantitative comparison includes one or more of the following: statistical analysis such as correlation and regression analysis using regression models; and correlation analysis using both linear and rank correlation; and
conducting, by the computer device, a risk-based capital adjustment using empirical results of the qualitative comparison and analysis with the set of realized financial losses.

15. The apparatus of claim 14, wherein the set of risk assessments include both a residual risk and a direction of risk.

16. The apparatus of claim 14, wherein the regression models includes one or more of the following: linear regression using a transformed scale, quantile regression, and count regression.

17. The apparatus of claim 14, wherein the regression analysis includes estimating a set of regression coefficients and a set of correlation coefficients and assessing the regression model adequacy.

18. The apparatus of claim 14, wherein the correlation analysis includes estimating a set of correlation coefficients and determining the statistical significance of the set of correlation coefficients.

19. A non-transitory computer-readable storage medium storing computer-executable instructions that, when executed, configure a processor to perform a method comprising:
identifying a set of risk assessments that includes residual risk and direction of risk, a set of control assessments, and a set of realized financial losses, wherein the set of realized financial losses include financial loss frequency and financial loss severity;
back-testing the set of risk assessments with the set of realized financial losses;
translating the set of risk assessments and the set of control assessments to a set of risk states and a set of risk points using an exponential scale across four dimensions, the dimensions including people, process, systems, and external events, wherein the set of risk states and the set of risk points list a residual risk, a direction of risk, a risk state, and a risk point for each of the four dimensions;
determining, by the computer device, a set of aggregate risks comprising an aggregate of the set of risk points across the four dimensions, wherein each aggregate risk of the set of aggregate risks corresponds to a particular risk state and is determined by combining the risk points associated with the particular risk state of the four dimensions;
conducting data analysis and statistical analysis on the set of realized financial losses aggregated by multiple loss dates, the set of risk states, and the set of risk points, wherein the data analysis and the statistical analysis includes a qualitative comparison and analysis and a quantitative comparison, wherein the quantitative comparison includes one or more of the following: statistical analysis such as correlation and regression analysis using a regression model; and correlation analysis using both linear and rank correlation; and
conducting, by the computer device, a risk-based capital adjustment using empirical results of the qualitative comparison and analysis with the set of realized financial losses.

20. The non-transitory computer-readable medium of claim 19, storing computer-executable instructions that, when executed, cause a processor to perform the method further comprising:
determining at least one of the financial loss frequency and the financial loss severity based, at least in part, on a results obtained from the data analysis and the statistical analysis, wherein the set of financial losses are from two different dates that include a loss even occurrence date and a loss event settlement date.

21. The non-transitory computer-readable medium of claim 19, wherein the regression model includes one or more of the following: linear regression using a transformed scale, quantile regression, and count regression.

* * * * *